United States Patent
Mehndiratta et al.

(10) Patent No.: US 12,341,334 B2
(45) Date of Patent: Jun. 24, 2025

(54) FAULT DETECTION IN SHUNT CAPACITOR BANKS

(71) Applicant: Hitachi Energy Ltd, Zürich (CH)

(72) Inventors: Sourabh Mehndiratta, Haryana (IN); Sandeep Pabbathi, Telangana (IN); Prabakaran Selvaraj, Bangalore (IN); Arulselvan Govindaraj, Coimbatore (IN); Sachin Srivastava, Karnataka (IN)

(73) Assignee: Hitachi Energy Ltd, Zürich (CH)

( * ) Notice: Subject to any disclaimer, the term of this patent is extended or adjusted under 35 U.S.C. 154(b) by 119 days.

(21) Appl. No.: 18/025,786

(22) PCT Filed: Aug. 26, 2021

(86) PCT No.: PCT/EP2021/073689
§ 371 (c)(1),
(2) Date: Mar. 10, 2023

(87) PCT Pub. No.: WO2022/053329
PCT Pub. Date: Mar. 17, 2022

(65) Prior Publication Data
US 2024/0072533 A1    Feb. 29, 2024

(30) Foreign Application Priority Data
Sep. 14, 2020  (IN) .............................. 202041039777

(51) Int. Cl.
*H02H 7/16*    (2006.01)

(52) U.S. Cl.
CPC ..................................... *H02H 7/16* (2013.01)

(58) Field of Classification Search
CPC ........................................................ H02H 7/16
See application file for complete search history.

(56) References Cited

U.S. PATENT DOCUMENTS

| 6,212,446 B1* | 4/2001 | Sato .......................... H02J 3/40 |
| | | 700/292 |
| 8,792,216 B2 | 7/2014 | Gajic |
| 10,108,664 B2* | 10/2018 | Konik ..................... G06F 16/25 |
| 2008/0007230 A1 | 1/2008 | Kalyuzhny et al. |
| 2008/0291593 A1 | 11/2008 | Day et al. |
| 2013/0128393 A1 | 5/2013 | Gajic |
| 2013/0204554 A1* | 8/2013 | Tuckey .............. G01R 31/2843 |
| | | 702/58 |
| 2013/0328569 A1 | 12/2013 | Gajic et al. |
| 2015/0355259 A1 | 12/2015 | Sartler et al. |

(Continued)

FOREIGN PATENT DOCUMENTS

JP          S60128437 U       8/1985

*Primary Examiner* — Harry R Behm
(74) *Attorney, Agent, or Firm* — PROCOPIO, CORY, HARGREAVES & SAVITCH LLP (57) ABSTRACT

Fault detection in a shunt capacitor bank connected to a power system is described. Voltage and current measurements are obtained at a terminal of the shunt capacitor bank. An electrical parameter is calculated based on the voltage and current measurements, where the electrical parameter is an impedance angle or an active power. A difference between a first and a second value of the electrical parameter is calculated, based on which a fault is detected.

18 Claims, 4 Drawing Sheets

(56) References Cited

U.S. PATENT DOCUMENTS

| | | | |
|---|---|---|---|
| 2016/0084893 A1* | 3/2016 | Gubba Ravikumar | ........................ G01R 21/00 702/60 |
| 2017/0059639 A1* | 3/2017 | Hashmi | ..................... H02J 3/18 |
| 2020/0241060 A1* | 7/2020 | Couillard | ................. H02J 3/001 |
| 2021/0063460 A1* | 3/2021 | Dase | ..................... H02H 7/261 |

* cited by examiner

Fig. 4

FAULT DETECTION IN SHUNT CAPACITOR BANKS

CROSS-REFERENCE TO RELATED APPLICATIONS

The present application is a national stage entry of International Patent App. No. PCT/EP2021/073689, filed on Aug. 26, 2021, which-claims priority to Indian Patent Application number 202041039777, filed on Sep. 14, 2020, which are both hereby incorporated herein by reference as if set forth in full.

TECHNICAL FIELD

The present subject matter relates, in general, to fault detection in a power system. In particular, the present subject matter relates to fault detection in a shunt capacitor bank.

BACKGROUND

Shunt Capacitor Banks (SCBs) are used for reactive power compensation in a power system. Typically, SCBs include capacitor elements which contain capacitor groups made of capacitors connected in series and parallel. Reactive power compensation in a power system provides reactive power support which improves the power system capacity, improves the power factor of the system, and provides better voltage stability. However, power systems often suffer from internal or external faults and disturbances, which may result in arcing faults in the SCB. If the arcing faults that occur in a shunt capacitor bank go undetected, it can cause damage to the complete capacitor bank.

BRIEF DESCRIPTION OF DRAWINGS

The features, aspects, and advantages of the present subject matter will be better understood with regard to the following description and accompanying figures. The use of the same reference number in different figures indicates similar or identical features and components.

SUMMARY

Embodiments of the present invention relate to methods for detecting a fault in a shunt capacitor bank connected to a power system, devices for fault detection, and computer readable storage mediums including instructions for fault detection. Objectives of the embodiments of the invention may be to identify a phase arcing fault within a capacitor bank within a short time interval, thereby avoiding the damage in the capacitor bank by early detection of cascading failure of units.

According to a first aspect, a method for detecting a fault in a shunt capacitor bank connected in a power system is provided. The method includes obtaining voltage measurements and current measurements at a terminal of the shunt capacitor bank. Based on the voltage and current measurements, an electrical parameter is computed. The electrical parameter computed is an impedance angle or an active power. Further, a difference between a first and a second value of the electrical parameter is calculated based on which a fault is detected.

According to a second aspect, a device for detecting a fault in a shunt capacitor bank connected to a power system is provided. The device includes a processor and a fault detection module executable by the processor. The fault detection module is configured to obtain voltage measurements and current measurements at a terminal of the shunt capacitor bank. The fault detection module is configured to compute an electrical parameter based on the voltage and current measurements. The electrical parameter computed is an impedance angle or an active power. Further, a difference between a first and a second value of the electrical parameter is calculated, based on which the fault is detected.

According to a third aspect, a non-transitory computer readable medium containing program instruction is provided, which when executed causes a device to detect a fault in a shunt capacitor bank connected to a power system.

According to one implementation, voltage measurements and current measurements are obtained in each phase at the terminal of the shunt capacitor bank.

According to another implementation, the first and the second value of the electrical parameter are consecutive to each other.

According to another implementation, detecting the fault comprises determining whether a predefined criterion is met, where the predefined criterion comprises an absolute value of sum of the difference between the first and the second value of the electrical parameter of a first one of the phases and the difference between the first and the second value of the electrical parameter of a second one of the phases is greater than the difference between the first and the second value of the electrical parameter of a third one of the phases and the absolute value of difference between the first and the second value of the electrical parameter of the first one of the phases and the absolute value of difference between the first and the second value of the electrical parameter of the second one of the phases are each greater than the respective threshold value.

According to another implementation, the fault is detected as a phase to phase fault between the first one of the phases and the second one of the phases.

According to another implementation, the respective threshold value of the electrical parameter is set based on accuracy of the measurement equipment.

According to another implementation, the shunt capacitor bank is connected to a three-phase transmission line in a double wye configuration.

According to another implementation, the fault is detected prior to cascading failure of the shunt capacitor bank.

According to another implementation, to determine the electrical parameter, an arc resistance is computed based on Warrington formula.

DETAILED DESCRIPTION

The present subject matter relates to fault detection in a shunt capacitor bank connected to a power system. The fault may be an arc-over within the capacitor bank, between the phases.

During phase arcing faults in an SCB, such as failure of capacitor elements or a flashover within the rack caused by a short circuit over single or multiple series of units of the same phase, a protection scheme may initiate an alarm to notify the operator about a potential shunt capacitor bank failure. Tripping of the bank helps minimize damage and prevent possible rapid cascading of the fault by other failed elements/units. Therefore, it is desirable to detect phase arcing faults within a short duration of time to avoid cascading failure in the SCB.

Conventionally, in one technique the magnitude of current and its peak are used to detect arcing faults in a shunt capacitor bank. The current-magnitude based method may fail during system disturbances that may occur near the capacitor bank. In another technique, arcing faults with ground are detected based on third order harmonics present in the voltage signal. However, this technique fails to detect the phase arcing faults. In another technique, the arcing faults are detected with the magnitude of negative sequence current. However, this technique is sensitive to external disturbances and needs to be coordinated with other protection systems of the power system which would introduce a delay of 15-20 power cycles. Also, the operation level to setup the negative sequence current based detection technique is complex.

The most effective protection for an arc-over within the capacitor bank is provided by a fast unbalance relay. Although the unbalance trip relay is the most effective protection for arc detection of a series section, the neutral voltage type of unbalance relay cannot be relied upon for rack fault protection on capacitor banks where all three phases are not well separated. In the present example, an ungrounded single wye capacitor bank with two series groups per phase, where all three phases are installed upon a single steel structure is considered. The individual phases are stacked over each other so that the initial fault may occur as a mid-rack phase-to-phase fault. This fault does not cause an unbalance of the neutral voltage or neutral current if grounded, due to which a neutral unbalance relay does not respond. The initial fault may spread until it becomes severe enough to operate the time or instantaneous overcurrent relays. However, there may be considerable damage involving all three phases before the bank trips.

With a shunt capacitor bank constructed such that the individual phases are well separated on separate structures, an arc-over within the capacitor bank will begin as an arc-over of a single series group. Such a fault produces very little phase overcurrent. If an unbalance relay protection scheme fails to operate, more and more series groups of the same phase can become involved until the bank overcurrent relays trip the bank or fuses clear. This fault is accompanied by heavy damage to the bank, including many blown fuses and ruptured capacitor units. Instantaneous overcurrent relays are usually not effective for rack faults because of their required high setting.

For example, a 10 MVAr, 52 kV externally fused grounded double wye connected capacitor bank with parameters as depicted in Table 1 is analyzed for performance of various protection schemes based on the magnitude of voltages and current.

TABLE 1

PARAMETERS OF SCB USED FOR FAULT ANALYSIS

| Parameters of SCB | Value |
|---|---|
| Connection type of SCB | Externally fused grounded double WYE |
| Rated filter voltage | 52 kV |
| Filter Rating | 10 MVAr |
| System frequency | 50 Hz |
| No of parallel group capacitor unit ($P_u$) in each section (left or right) | 1 |
| No of series capacitor unit ($S_u$) | 8 |
| No of parallel group capacitor elements in unit ($P_e$) | 1 |
| No of series capacitor elements ($S_e$) | 6 |
| Capacitive element value Ce | 36 uF |
| Fault location in p.u. (m) (e.g.: for phase arcing fault at the top m = 0 and for phase arching fault at the bottom m = 1) | 0-1 |

Figure 1:
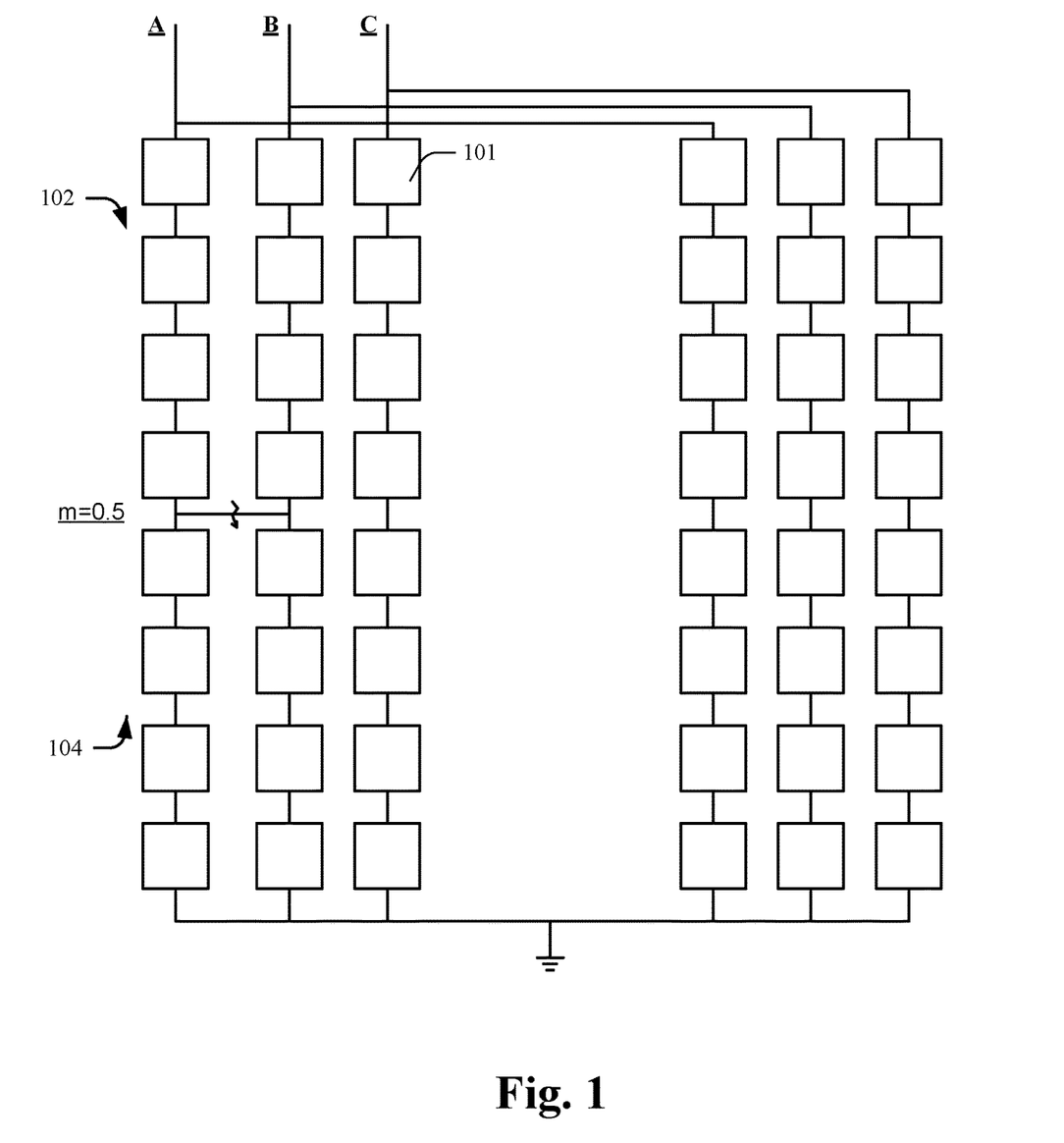
FIG. 1 illustrates an example arrangement of capacitor units in the SCB.

FIG. 1 illustrates an example arrangement of capacitor units 101 in the SCB and the results of the analysis are shown in Table 2, where the fault location in per unit value is denoted by 'm'. The value of 'm' can vary between '0' and '1', where '0' denotes the fault location for a phase arcing fault at the top of the SCB 102 and '1' denotes the fault location of a phase arcing fault at the bottom of the SCB 104. In the present example, a phase arcing fault at different fault positions (m) is considered. The primary protection scheme that was employed for tripping of the relay was overvoltage (OV) set to 110% of the rated voltage and the overcurrent (OC) set to 135% of the rated current.

As it can be observed from Table 2 shown below, when a phase arcing fault occurs towards the bottom of the SCB (m=0.875) it is observed that the rise in voltage and the magnitude of fault current is lesser than the pre-set values of the OV and OC to detect. As a result, the value of voltage across the healthy units of the bank continue to rise till they reach 110% of the rated voltage before the protection relay trips which may subsequently lead to a cascading failure in the SCB.

TABLE 2

SIMULATION RESULTS FOR PHASE ARCING FAULT AT DIFFERENT FAULT POSITIONS

| Fault Position | m | Measured Bus Voltages (in pu) | | | Measured Phase Currents (in pu) | | | | $E_{HealthyUnit}$ (pu) | $I_{Neg.\ Seq}$ (pu) | Response of other Protection Schemes |
|---|---|---|---|---|---|---|---|---|---|---|---|
| | | $E_A$ | $E_B$ | $E_C$ | $I_A$ | $I_B$ | $I_C$ | $I_N$ | | | |
| 7 | 0.875 | 1.0092 | 1.0075 | 1.0017 | 1.0641 | 1.0623 | 1.0018 | 0 | 1.1195 | 0.004 | OC and |
| 6 | 0.75 | 1.01955 | 1.0154 | 1.0017 | 1.1505 | 1.1462 | 1.0018 | 0 | 1.2848 | 0.0957 | OV fails |
| 5 | 0.625 | 1.0343 | 1.0268 | 1.0017 | 1.2776 | 1.2697 | 1.0018 | 0 | 1.5297 | 0.1752 | to pick up |
| 4 | 0.5 | 1.0576 | 1.0447 | 1.0017 | 1.481 | 1.4672 | 1.0018 | 0 | 1.9221 | 0.2996 | OC and OV operated |

Also, as the fault is a phase arcing fault there will be no neutral current due to the unbalance and hence, a protection scheme based on neutral current will not respond. Further, the negative sequence-based protection will introduce a time delay of 15-20 power cycles for adequate coordination between other protection devices of the power system for faults external to the bank. An arc-over fault between different phases produces very little phase current and phase overvoltage and this fault results in increase in the voltage of healthy units. Hence, there is a need for capacitor bank to be protected from phase arcing faults at the earliest to minimize the damage.

The present subject matter provides a fast and reliable protection scheme for the shunt capacitor bank connected to a power system against phase arcing faults. Detecting the fault is based on values of three phase voltages and currents measured at the terminal of the SCB. An example method includes obtaining three phase voltages and currents measurements at the SCB terminal as a voltage signal or a current signal respectively, using measurement equipment. The signals are continuously measured to compute an electrical parameter such as impedance angle or active power or both at each phase. Further, a difference between a first and a second value of the electrical parameter is computed and tested for a predefined criterion to detect the fault.

The proposed methods and devices identify the phase arcing fault within the capacitor bank, also referred to as rack-to-rack faults, within a short time interval, thereby avoiding the damage in the capacitor bank by early detection of cascading failure of units. The proposed method is insensitive to external system disturbances enhancing the response time. Further, no additional sensors or hardware equipment are required for detection of the arcing faults.

The above and other features, aspects, and advantages of the subject matter will be better explained with regard to the following description and accompanying figures. Wherever possible, the same reference numbers are used in the drawings and the following description to refer to the same or similar parts. While several examples are described, modifications, adaptations, and other implementations are possible.

Figure 2:
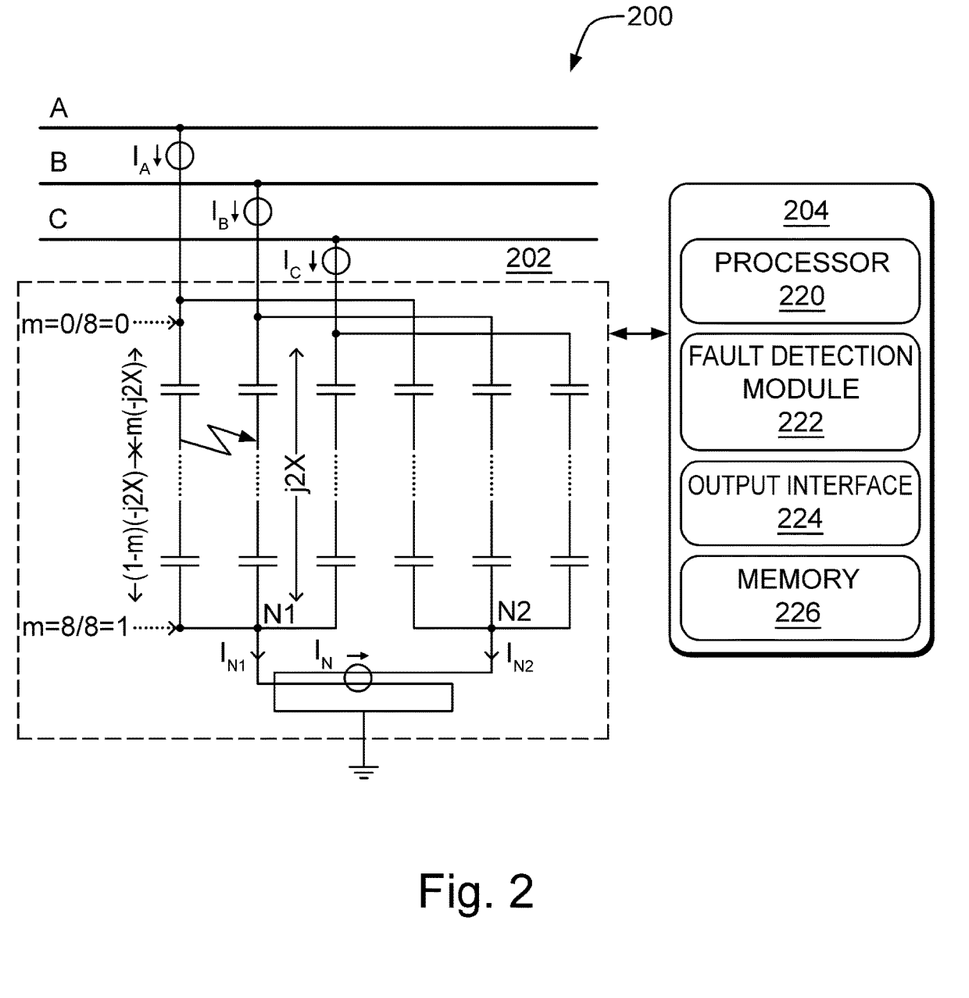
FIG. 2 illustrates a power system including a device for fault detection in an SCB, in accordance with an embodiment of the present subject matter.

FIG. 2 illustrates a power system including a device for fault detection in an SCB, in accordance with an embodiment of the present subject matter. A power system 200 as shown in the figure includes a three-phase transmission line that may be a part of a transmission and a distribution network. While for discussion purposes the SCB is shown as connected to power transmission lines, it will be understood that the teachings of the present subject matter can be applied to SCBs connected to other power lines also. A shunt capacitor bank 202 may be connected to the power system 200 to provide reactive power support. In one example, the SCB may be a double wye configuration connected to the three phases of the transmission line. However, the SCB 202 may have various configurations depending on the manner in which the capacitor units may be connected.

It will be understood that the power system 200 for fault detection may include a plurality of additional components or devices for monitoring, sensing, and controlling various parameters that may be associated with the shunt capacitor bank and the power system but are not shown for brevity. For example, components such as circuit breakers, sensors, current transformers, voltage transformers, loads connected to the power system, shunt reactors, intelligent electronic devices IEDs, protective relays and the like may be connected.

The techniques of the present subject matter may be implemented with one or more devices associated with the power system. The devices may include current transformers, voltage transformers, circuit breakers, and devices to detect the fault location. As shown in FIG. 2, a device 204 may be configured to receive voltage and current measurements at the terminal of the shunt capacitor bank. The device 204 may be configured to detect a fault in the SCB due to internal disturbances, such as failure of capacitor elements or a flashover within the rack, and external disturbances, such as increased level of harmonics or sustained over voltages. In response to that the device 204 detects the fault in the SCB, the device 204 may be configured to send a trip signal to the circuit breaker of the shunt capacitor bank 202. In one example, the device 204 may be an intelligent electronic device (IED). In another example, the device 204 may be any computing device, such as a server, a desktop device, a laptop, etc., which may receive the measurements from an IED.

In an example, the present subject matter may be implemented by one or more modules. The modules may be implemented as instructions stored in non-transitory computer readable medium and executable by one or more processors. For instance, in the example where the device 204 performs the method, the modules are executed by the processors of the device 204. In case the method is implemented in part by the device 204 and in part by a server, the modules (depending on the step) will be distributed accordingly in the device 204 and the server.

In one example, the device 204 may be configured to receive input measurement signals from various measurement equipment connected to the shunt capacitor bank, such as current transformers, potential transformers, Rogowski coils or other measurement sensors. The device 204 may process the measurements obtained with the help of a processor 220. The processor 220 may be implemented as a dedicated processor, a shared processor, or a plurality of individual processors, some of which may be shared. The device 204 may include a memory 226, that may be communicatively connected to the processor 220. Among other capabilities, the processor 220 may fetch and execute computer-readable instructions, stored in the memory 226. In one example, the memory 226 may store a fault detection module 222. In other examples, the fault detection module 222 may be external to the memory 226. The memory 226 may include any non-transitory computer-readable medium including, for example, volatile memory, such as RAM, or non-volatile memory, such as EPROM, flash memory, and the like.

Further, device 204 may include an output interface 224 to communicate the results obtained from the fault detection module 222, for example, to a server. In one example, when the method is implemented at a server, the device 204 may communicate the current and voltage measurements to the server through the output interface 224. The output interface 224 may include a variety of computer-readable instructions-based interfaces and hardware interfaces that allow interaction with other communication, storage, and computing devices, such as network entities, web servers, databases, and external repositories, and peripheral devices. In one example, the fault detection parameters, current and voltage measurements, and the like may be viewed on a display connected to the output interface 224 or integrated with the device 204.

In operation, to detect a phase arcing fault in the shunt capacitor bank 202 connected in the power system 200, the processor 220 of the device 204 executes a fault detection module 222 to obtain voltage measurements and current measurements at a terminal of the shunt capacitor bank 202. In one example, the voltage measurements and current measurements are obtained in each phase at the terminal of the shunt capacitor bank 202. The voltage measurements and the current measurements may be obtained with one or more measurement equipment associated with the terminal as may be understood. Based on the voltage and current measurements, the processor 220 may compute an electrical parameter. In one example, the electrical parameter may be an active power. In another example, the electrical parameter be an impedance angle. The fault may be detected based on the computed active power, impedance angle, or both. In one example, the fault detected may be a phase arcing fault.

In one example, apparent power flow during phase arcing fault, which is a combination of active power and the reactive power, and arc resistance may be first calculated. In one example, the arc resistance during arcing may be considered to be zero. In another example, the arc resistance during arcing may be computed, as will be discussed later. For discussion purpose, a fault between phases A and B is considered as an example and the apparent power on occurrence of a fault may be calculated as explained below. The equations (1) and (2) depict the apparent power in phase A and phase B.

$$S_A = V_A * I^*_A \quad (1)$$

$$S_B = V_B * I^*_B \quad (2)$$

where,
$S_A$ is the apparent power of phase A, and
$S_B$ is the apparent power of phase B.
$V_A$ is the voltage measured at phase A
$I_A$ is the current measured at phase A.
$V_B$ is the voltage measured at phase B
$I_B$ is the current measured at phase B.

Further, the phase angle between $V_A$ and $I_A$ may be denoted as 'Øa' and the phase angle between $V_B$ and $I_B$ may be denoted as 'Øb'. A phase arcing fault between phase A and phase B at the $m^{th}$ fraction on a capacitor unit may be considered, where 'm' denotes the fault location. The values of $I_A$ and $I_B$ may be calculated by the processor 220 using superposition theorem, a method well known in the art, to give equations (3) and (4):

$$I_A = \frac{1}{2*(-jm*2X)} * (m*(V_A+V_B)+(V_A-V_B)) + \frac{V_A}{(-j2X)} \quad (3)$$

$$I_B = \frac{1}{2*(-jm*2X)} * (m*(V_B+V_A)+(V_B-V_A)) + \frac{V_B}{(-j2X)} \quad (4)$$

where,
m is the fault position, and
X is the reactance of each phase of the capacitor bank.
Further, on Substituting $V_A = V \angle 0°$ and $V_B = V \angle 120°$, where V is the RMS value of phase to ground voltage and the Ia and Ib in equation 1 and 2 respectively, we get equations (5) and (6) as shown below, $$S_A = -\frac{\sqrt{3}V^2}{8X} * \left(\frac{1-m}{m}\right) - j*\left(\left(\frac{3+m}{4m}\right)*\frac{V^2}{2X} + \frac{V^2}{2X}\right) \quad (5)$$

$$S_B = \frac{\sqrt{3}V^2}{8X} * \left(\frac{1-m}{m}\right) - j*\left(\left(\frac{3+m}{4m}\right)*\frac{V^2}{2X} + \frac{V^2}{2X}\right) \quad (6)$$

Similarly, if a phase arcing fault between phase B and phase C is considered, the apparent power in phase B and phase C is calculated using equations (7) and (8) respectively, as shown below:

$$S_B = -\frac{\sqrt{3}V^2}{8X} * \left(\frac{1-m}{m}\right) - j*\left(\left(\frac{3+m}{4m}\right)*\frac{V^2}{2X} + \frac{V^2}{2X}\right) \quad (7)$$

$$S_C = \frac{\sqrt{3}V^2}{8X} * \left(\frac{1-m}{m}\right) - j*\left(\left(\frac{3+m}{4m}\right)*\frac{V^2}{2X} + \frac{V^2}{2X}\right) \quad (8)$$

From the above equations it can be understood that during normal operation of the power system 200, i.e., when the value of m=1, the active power will be 0 and only reactive power, which may be computed using the expression ($-V^2/X$), flows into the power system 200. Unless there is internal resistance in the SCB, the SCB supplies only reactive power to the power system 200. During any fault, that is when the value of m is lesser than 1, an active power flow between the phases may be observed. Based on this active power flow, a predefined criterion may be set to detect the phase arcing faults. In one example, the predefined criterion may be stored in the memory 226 and the processor 220 may execute the fault detection module 222 to detect a phase arcing fault between the first one of the phases and the second one of the phases based on the predefined criteria.

An ideal capacitor bank does not consume any active power and supplies only reactive power to the power system 200. In one example, under practical conditions the SCB may consume negligible amount of active power due to contact resistance or due to leakage current through the capacitors. However, when the SCB has phase arcing fault, the amount of active power flowing through the SCB would no longer be negligible. The fault detection module 222 may compute, in one example, the active power flow during pre-fault conditions and on occurrence of a fault to detect the fault. In another example, the fault detection module 222 may compute the impedance angle during pre-fault conditions and on occurrence of a fault to detect the fault. In yet another example, the fault detection module 222 may compute both the active power flow and the impedance angle for fault detection.

In one example method, based on each voltage and current measurement in each phase, the change in the active power flow may be computed by calculating a difference between two consecutive active power computations. In one example, the difference between a first and a second value of the active power computations may be denoted as 'ΔP'. The value of ΔP may be computed for all three phases and verified with the predefined criterion as depicted in Table 3 to detect a phase arcing fault.

TABLE 3

PREDEFINED CRITERION FOR FAULT DETECTION

| Sl. No. | Criteria | Decision |
| --- | --- | --- |
| 1 | $|\Delta P_A + \Delta P_B| \Rightarrow \Delta P_C$ && ($|\Delta P_A| > P_{Set}$) && ($|\Delta P_B| > P_{Set}$) | Rack fault between the A and B phases |
| 2 | $|\Delta P_B + \Delta P_C| \Rightarrow \Delta P_A$ && ($|\Delta P_B| > P_{Set}$) && ($|\Delta P_C| > P_{Set}$) | Rack fault between the B and C phases |
| 3 | $|\Delta P_C + \Delta P_A| \Rightarrow \Delta P_B$ && ($|\Delta P_C| > P_{Set}$) && ($|\Delta P_A| > P_{Set}$) | Rack fault between the C and A phases |

As can be understood from the above table, when the absolute value of sum of the difference between the first and the second value of the active power computations of each of a first one of the phases and a second one of the phases is greater or equal to the difference between the first and the second value of the active power computations of a third one of the phases and the absolute values of the difference between the first and the second value of the active power computations of each of the first one of the phases and the second one of the phases is greater than a threshold value, the fault detection module 222 determines that a phase arcing fault is detected between the first one of the phases and the second one of the phases. The first one of the phases may be any one of A, B, and C phases, the second one of the phases may be a different one of A, B, and C phases, and the third one of the phases may be a third one of the A, B, and C phases. The threshold value may be set based on accuracy of the measurement equipment used.

Figure 3:
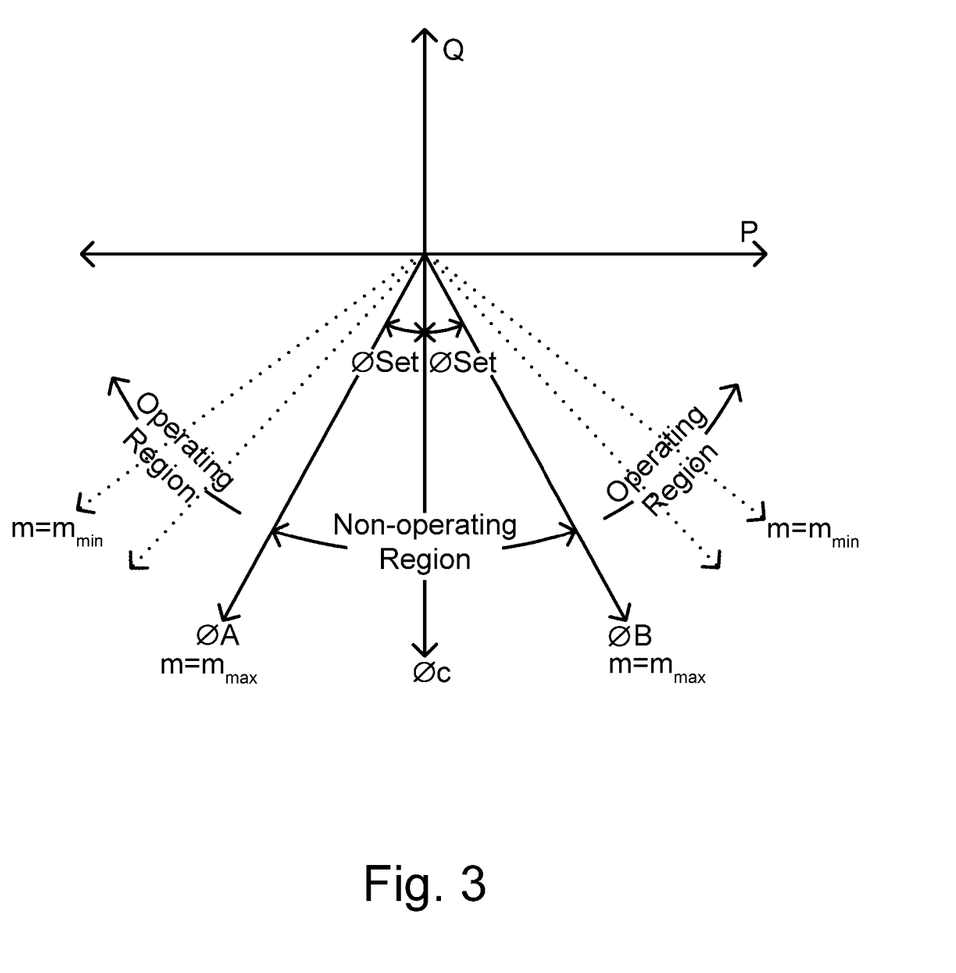
FIG. 3 illustrates the locus of the impedance angle when a phase arcing fault occurs between phase A and phase B in accordance with the present subject matter.

Similarly, the fault detection module 222 may be configured to detect the fault based on an impedance angle. When the SCB supplies only reactive power to the system, the impedance angle is always close to 90 degrees under normal operation. FIG. 3 illustrates the locus of the impedance angle when a phase arcing fault occurs between phase A and phase B in accordance with the present subject matter. However, when a phase arcing fault occurs between the capacitor units of a capacitor bank, the impedance angle would no longer be 90 degrees. Continuing with the discussion of FIG. 2, the processor 220 may calculate the impedance angle based on equations (9) or (10) as shown below:

$$\emptyset = ((<V ph) - (<I ph)) \text{ or} \qquad (9)$$

$$\emptyset = \tan^{-1}\left(\frac{Q_{Ph}}{P_{Ph}}\right) \qquad (10)$$

where,
  <Vph and <Iph are the phase angles of the voltage and current measurements respectively, and
  $P_{Ph}$ and $Q_{Ph}$ are the phase angles of the active power and the reactive power measured.

Based on each voltage and current measurement in each phase, the change in an impedance angle between fault and pre-fault conditions may be computed by calculating a difference between a first and a second value of the impedance angles. In one example, the difference between the first and the second value of the impedance angles may be denoted as '$\Delta\emptyset$'. The value of $\Delta\emptyset$ may be computed for all three phases and verified with the predefined criterion as depicted in Table 4 to detect an internal arcing fault.

TABLE 4

PREDEFINED CRITERION FOR FAULT DETECTION

| Sl. No. | Criteria | Decision |
|---|---|---|
| 1 | $\|\Delta\emptyset_A + \Delta\emptyset_B\| => \Delta\emptyset_C$ && ($\|\Delta\emptyset_A\| > \emptyset_{Set}$) && ($\|\Delta\emptyset_B\| > \emptyset_{Set}$) | Rack fault between the A and B phases |
| 2 | $\|\Delta\emptyset_B + \Delta\emptyset_C\| => \Delta\emptyset_A$ && ($\|\Delta\emptyset_B\| > \emptyset_{Set}$) && ($\|\Delta\emptyset_C\| > \emptyset_{Set}$) | Rack fault between the B and C phases |
| 3 | $\|\Delta\emptyset_C + \Delta\emptyset_A\| => \Delta\emptyset_B$ && ($\|\Delta\emptyset_C\| > \emptyset_{Set}$) && ($\|\Delta\emptyset_A\| > \emptyset_{Set}$) | Rack fault between the C and A phases |

As can be understood from the above table, when the absolute value of sum of the difference between the first and the second value of the impedance angles of a first one of the phases and the difference between the first and the second value of the impedance angles of a second one of the phases is greater or equal to the difference between the first and the second value of the impedance angles of a third one of the phases, and the absolute values of the difference between the first and the second value of the impedance angles of each of the first one of the phases and the second one of the phases is greater than a threshold value, the fault detection module 222 determines that a phase arcing fault between the first one of the phases and the second one of the phases has been detected. The first one of the phases may be any one of A, B, and C phases, the second one of the phases may be a different one of A, B, and C phases, and the third one of the phases may be a third one of the A, B, and C phases. The threshold value may be set based on accuracy of the measurement equipment used.

While the above computations may be performed considering the arcing resistance to be zero, arc faults are usually accompanied with some resistance and the Warrington formula may be used to formulate the arc resistance as discussed below, for performing the above computations. The arc resistance value may be derived from the Warrington formula as depicted in equation (11).

$$R_{arc} = \frac{28707.35 * L}{I^{1.4}} \qquad (11)$$

where,
  L is the length of the arc, which is the distance between the faulty racks of the phases A and B or phases B and C, and
  I is the root mean square RMS value of current flowing through the arc Considering a phase arcing fault to have occurred between the phases AB or phases BC, the current flowing through the arc may be computed using equation (12) as shown below:

$$I = \frac{(1-m) * V_{L-L}}{\sqrt{R_{arc}^2 + (2m * (1-m) * X)^2}} \qquad (12)$$

where,
  X is the capacitive reactance per phase
  Further, on considering $R_{arc}^2 << (2m*(1-m)*X)^2$ and substituting in equation (12) we get:

$$I = \frac{V_{L-L}}{2m * X} \qquad (13)$$

On substituting equation (13) in equation (11) we get:

$$R_{arc} \simeq 28707.35 * L * \left(\frac{2m * X}{V_{L-L}}\right)^{1.4} \qquad (14)$$

Considering Q to be the rated MVAR of the double wye connected capacitor bank, where Q is depicted by the expression:

$$Q = \frac{V_{L-L}^2}{X}$$

Further on substituting the above expression in equation (14) we get:

$$R_{arc} \simeq 28707.35 * L * \left(\frac{2m * V_{L-L}}{Q}\right)^{1.4} \qquad (15)$$

The computed arcing resistance can be then used for determining the reactance and computing the fault location as discussed above.

The present subject matter hence provides an efficient phase arcing fault detection in a shunt capacitor bank connected to a power system. The proposed fault determination technique can be implemented for detecting phase arcing faults between phases of an SCB within a short duration of time before the onset of a cascading failure of the capacitor units.

Figure 4:
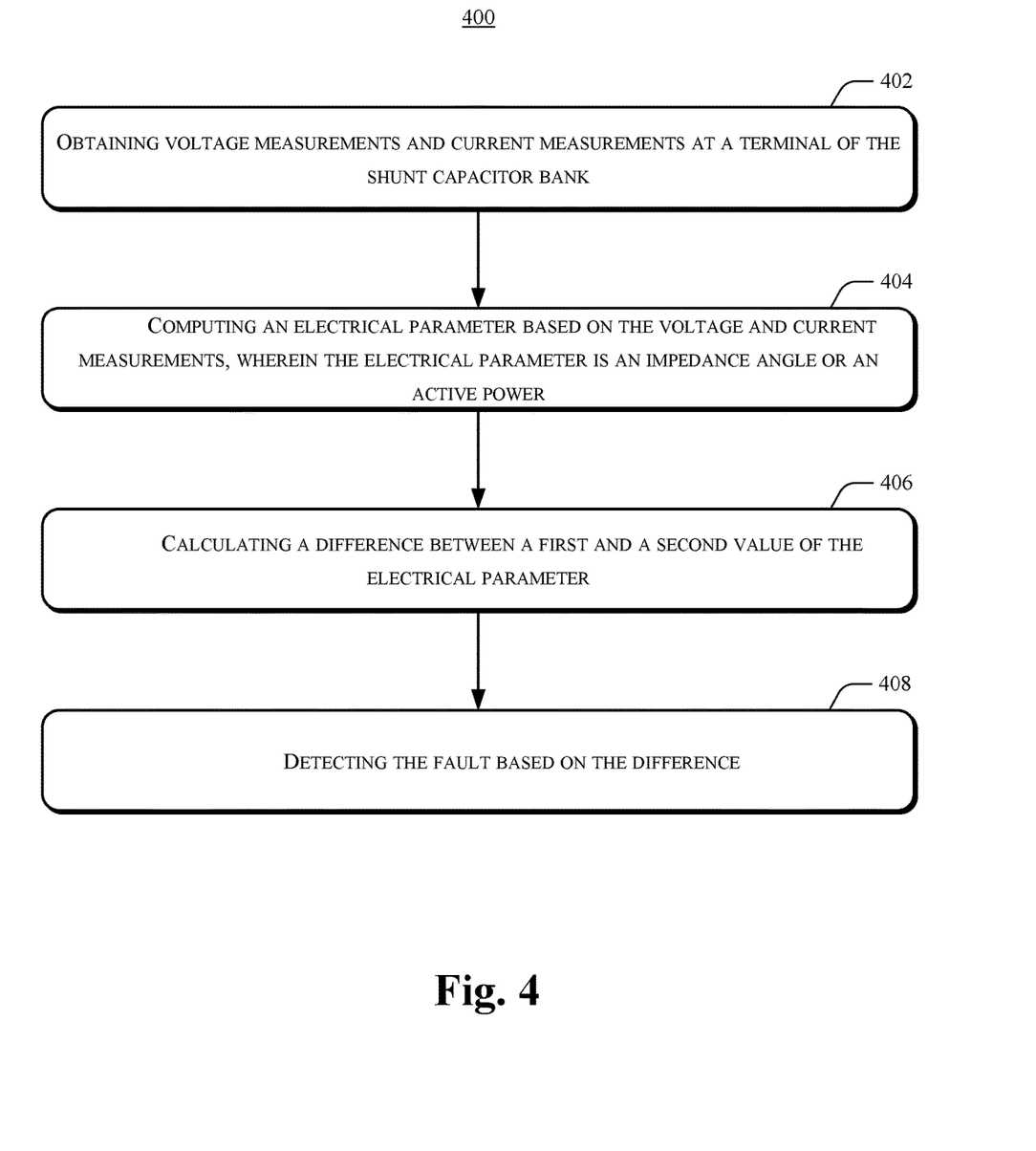
FIG. 4 illustrates a method for detecting a fault in a shunt capacitor bank, in accordance with an embodiment of the present subject matter.

FIG. 4 illustrates a method for detecting a fault in a shunt capacitor bank, in accordance with an embodiment of the present subject matter. The order in which a method 400 is described is not intended to be construed as a limitation, and some of the described method blocks may be performed in a different order to implement the method 400 or an alternative method. Furthermore, the method 400 may be implemented in any suitable hardware, computer readable instructions, firmware, or combination thereof. For discussion, the method 400 is described with reference to the implementations illustrated in FIG. 2.

In the method 400 at block 402, voltage measurements and current measurements are obtained at a terminal of the shunt capacitor bank. The voltage measurements and current measurements are obtained in each phase at the terminal of the shunt capacitor bank. The voltage and current measurements are obtained with one or more measurement equipment associated with the terminal of the shunt capacitor bank. In one example, the voltage and current measurements are fed to the device 204.

At block 404, an electrical parameter is computed based on the voltage and current measurements. The electrical parameter corresponds to an impedance angle or an active power. The electrical parameter is computed for each new voltage and current measurements.

At block 406, a difference between a first and a second value of the electrical parameter may be calculated. In one example, the first and the second value of the electrical parameter are consecutive to each other. The difference between the first and the second value of the electrical parameter for each voltage and current measurement in each phase may be calculated and stored in the memory 226.

At block 408, the fault is detected based on the difference between the first and the second value of the electrical parameter. In one example, the detection of the fault may be based on a predefined criterion. In one example, the predefined criterion may be based on the difference between the first and the second value of the electrical parameter for each voltage and current measurement in each phase, and the predefined criteria may be stored in the memory 226.

In one example, the predefined criterion may be that when an absolute value of sum of the difference between the first and the second value of the electrical parameter of a first one of the phases and the difference between the first and the second value of the electrical parameter of a second one of the phases is greater than the difference between the first and the second value of the electrical parameter of a third one of the phases, and the absolute value of difference between the first and the second value of the electrical parameter of the first one of the phases and the second one of the phases is each greater than a respective threshold value a fault may be detected.

The respective threshold values for the predefined criteria may be set based on the accuracy of measurement equipment. Further, on detecting a fault in the SCB, the device 204 may employ a protection scheme to trip the SCB within a short duration of time to avoid cascading failure of capacitor units.

The above discussed methods can be used to detect phase arcing faults at even at lower units of capacitor banks and thereby avoid initiation of cascading failure of the SCB. Simulation results are provided below for a system with L=471 mm, VL–L=52 kV and Q=10 MVAr with parameters as considered above in Table 1 and the simulation results are compared with those provided in Table 2. It will be understood that these simulations are provided merely as examples for validation of the present techniques and not as limitations.

Example 1

In a first example, the technique of fault detection was tested for active power as the electrical parameter. Active power flow in different phases for phase arcing faults between phase A and phase B at different fault locations was tested.

Considering the arc resistance to be zero, the active power flow in different phases with phase A-phase B type phase arcing fault was simulated and has been tabulated in Table 5 as shown below:

TABLE 5

ACTIVE POWER FLOW IN DIFFERENT PHASES WITH PHASE A-PHASE B TYPE ARCING FAULTS (HAVING RARC = 0) AT DIFFERENT FAULT LOCATIONS.

| Fault Position | m | Real Power (in pu) during fault | | | Real Power (in pu) Pre-fault | | | Change in Power $P_{(Prefault)} - P_{(fault)} = \Delta P$ | | |
|---|---|---|---|---|---|---|---|---|---|---|
| | | $P_A$ | $P_B$ | $P_C$ | $P_A$ | $P_B$ | $P_C$ | $\Delta P_A$ | $\Delta P_B$ | $\Delta P_C$ |
| 7 | 0.875 | −0.031 | 0.0315 | 0.00002 | 0.00002 | 0.00002 | 0.00002 | 0.03102 | −0.03148 | 0 |
| 6 | 0.75 | −0.073 | 0.0742 | 0.00002 | 0.00002 | 0.00002 | 0.00002 | 0.07302 | −0.07418 | 0 |
| 5 | 0.625 | −0.135 | 0.1356 | 0.00002 | 0.00002 | 0.00002 | 0.00002 | 0.13502 | −0.13558 | 0 |
| 4 | 0.5 | −0.231 | 0.231 | 0.00002 | 0.00002 | 0.00002 | 0.00002 | 0.23102 | −0.23098 | 0 |
| 3 | 0.375 | −0.402 | 0.403 | 0.00002 | 0.00002 | 0.00002 | 0.00002 | 0.40202 | −0.40298 | 0 |
| 2 | 0.25 | −0.796 | 0.797 | 0.00002 | 0.00002 | 0.00002 | 0.00002 | 0.79602 | −0.79698 | 0 |
| 1 | 0.125 | −2.59 | 2.59 | 0.00002 | 0.00002 | 0.00002 | 0.00002 | 2.59002 | −2.58998 | 0 |

However, as arc faults are usually accompanied with some resistance, the real-life arc may be calculated according to equation (15) and the arc resistance and different fault positions may be computed. Table 6 depicts the arc-resistance at different fault positions having an arc length of 471 mm, the system having a line-to-line voltage of 52 kV and reactive power of 10 MVAr.

TABLE 6

COMPUTATION OF ARC RESISTANCE
AT DIFFERENT FAULT POSITIONS.

| m | 0.125 | 0.25 | 0.375 | 0.5 | 0.625 | 0.75 | 0.875 |
|---|---|---|---|---|---|---|---|
| $R_{arc}$ (in Ω) | 1.23 | 3.25 | 5.73 | 8.57 | 11.72 | 15.13 | 18.77 |

Further, the technique of fault detection was tested for active power flow in different phases for phase arcing faults between phase A and phase B at different fault locations with arc resistance as depicted in Table 6. The active power flow in different phases with phase A-phase B type arcing fault and having an arc resistance has been tabulated in Table 7 as shown below:

TABLE 7

ACTIVE POWER FLOW IN DIFFERENT PHASES WITH PHASE A-PHASE B ARCING FAULTS
(HAVING RARC AS PER WARRINGTON FORMULA) AT DIFFERENT FAULT LOCATIONS.

| $R_{arc}$ (in Ω) | Fault Position | m | Real Power (in pu) During fault | | | Real Power (in pu) Pre-fault | | | Change in Power $P_{(Prefault)} - P_{(fault)} = \Delta P$ | | |
|---|---|---|---|---|---|---|---|---|---|---|---|
| | | | $P_A$ | $P_B$ | $P_C$ | $P_A$ | $P_B$ | $P_C$ | $\Delta P_A$ | $\Delta P_B$ | $\Delta P_C$ |
| 18.77 | 7 | 0.875 | −0.021 | 0.0392 | 0.00002 | 0.00002 | 0.00002 | 0.00002 | 0.02102 | −0.0392 | 0 |
| 15.13 | 6 | 0.75 | −0.063 | 0.083 | 0.00002 | 0.00002 | 0.00002 | 0.00002 | 0.06302 | −0.0830 | 0 |
| 11.72 | 5 | 0.625 | −0.1233 | 0.1464 | 0.00002 | 0.00002 | 0.00002 | 0.00002 | 0.12332 | −0.1464 | 0 |
| 8.57 | 4 | 0.5 | −0.217 | 0.244 | 0.00002 | 0.00002 | 0.00002 | 0.00002 | 0.21702 | −0.2440 | 0 |
| 5.73 | 3 | 0.375 | −0.384 | 0.42 | 0.00002 | 0.00002 | 0.00002 | 0.00002 | 0.38402 | −0.4199 | 0 |
| 3.25 | 2 | 0.25 | −0.767 | 0.823 | 0.00002 | 0.00002 | 0.00002 | 0.00002 | 0.76702 | −0.8223 | 0 |
| 1.23 | 1 | 0.125 | −2.493 | 2.661 | 0.00002 | 0.00002 | 0.00002 | 0.00002 | 2.49302 | −2.6609 | 0 |

As can be observed from Table 5 and 7, for the phase A-phase B arc fault at different fault positions, the active power-based method with the predefined criteria $|\Delta P_A + \Delta P_B| => \Delta P_C$ && $(|\Delta P_A| > P_{Set})$ && $(|\Delta P_B| > P_{Set})$ helps to accurately detect the fault even at lower fault positions in contrast to Table 2. For this example, the threshold value $P_{set}$ was set to 2%.

Example 2

In a second example, the technique of fault detection was tested for impedance angle as the electrical parameter. Impedance angle in different phases for rack type faults between phase A and phase B at different fault locations was tested.

Considering the arc resistance to be zero, the impedance angle in different phases with phase A-phase B type phase arcing fault has been tabulated in Table 8 as shown below:

TABLE 8

IMPEDANCE ANGLES FOR THE DIFFERENT PHASES WITH PHASE A-PHASE B TYPE
ARCING FAULTS (HAVING RARC = 0) AT DIFFERENT FAULT POSITIONS.

| Fault Position | m | Impedance Angle (in deg.) During Fault | | | Impedance Angle (in deg.) Pre-fault | | | Change in Angle $\theta_{(Prefault)} - \theta_{(fault)} = \Delta\theta$ | | |
|---|---|---|---|---|---|---|---|---|---|---|
| | | $\theta_{A\_fault}$ | $\theta_{B\_fault}$ | $\theta_{C\_fault}$ | $\theta_{A\_prefault}$ | $\theta_{B\_prefault}$ | $\theta_{C\_prefault}$ | $\Delta\theta_A$ | $\Delta\theta_B$ | $\Delta\theta_C$ |
| 7 | 0.875 | −91.6565 | −88.309 | −89.985 | −89.985 | −89.985 | −89.985 | 1.67 | −1.67 | 0 |
| 6 | 0.75 | −93.6 | −86.342 | −89.985 | −89.985 | −89.985 | −89.985 | 3.61 | −3.64 | 0 |
| 5 | 0.625 | −95.864 | −84.027 | −89.985 | −89.985 | −89.985 | −89.985 | 5.8786 | −5.95 | 0 |
| 4 | 0.5 | −98.483 | −81.301 | −89.985 | −89.985 | −89.985 | −89.985 | 8.49 | −8.68 | 0 |
| 3 | 0.375 | −101.398 | −78.170 | −89.985 | −89.985 | −89.985 | −89.985 | 11.41 | −11.81 | 0 |
| 2 | 0.25 | −104.117 | −74.999 | −89.985 | −89.985 | −89.985 | −89.985 | 14.1332 | −14.98 | 0 |
| 1 | 0.125 | −103.169 | −75.007 | −89.985 | −89.985 | −89.985 | −89.985 | 13.18 | −14.97 | 0 |

Fault detection was also simulated based on computed arc resistance as depicted in Table 6 above. Further, impedance angles for fault detection with arc resistance as depicted in Table 6 for different phases with phase A-phase B type arcing faults has been tabulated in Table 9 as shown below:

TABLE 9

IMPEDANCE ANGLES FOR THE DIFFERENT PHASES WITH PHASE A-PHASE B TYPE ARCING FAULTS (HAVING RARC AS PER WARRINGTON FORMULA) AT DIFFERENT FAULT POSITIONS.

| $R_{arc}$ (in Ω) | Fault Position | m | Impedance Angle (in deg.) During Fault | | | Impedance Angle (in deg.) Pre-fault | | | Change in Angle $\varnothing_{(Prefault)} - \varnothing_{(fault)} = \Delta_\varnothing$ | | |
|---|---|---|---|---|---|---|---|---|---|---|---|
| | | | $\varnothing_{A\_fault}$ | $\varnothing_{B\_fault}$ | $\varnothing_{C\_fault}$ | $\varnothing_{A\_prefault}$ | $\varnothing_{B\_prefault}$ | $\varnothing_{C\_prefault}$ | $\Delta\varnothing_A$ | $\Delta\varnothing_B$ | $\Delta\varnothing_C$ |
| 18.77 | 7 | 0.875 | −91.687 | −88.318 | −89.99 | −89.985 | −89.985 | −89.985 | 1.69 | −1.66 | 0 |
| 15.13 | 6 | 0.75 | −93.671 | −86.330 | −89.99 | −89.985 | −89.985 | −89.985 | 3.68 | −3.65 | 0 |
| 11.72 | 5 | 0.625 | −96.053 | −83.947 | −89.99 | −89.985 | −89.985 | −89.985 | 6.06 | −6.03 | 0 |
| 8.57 | 4 | 0.5 | −98.948 | −81.052 | −89.99 | −89.985 | −89.985 | −89.985 | 8.96 | −8.93 | 0 |
| 5.73 | 3 | 0.375 | −102.52 | −77.480 | −89.99 | −89.985 | −89.985 | −89.985 | 12.53 | −12.50 | 0 |
| 3.25 | 2 | 0.25 | −106.99 | −73.004 | −89.99 | −89.985 | −89.985 | −89.985 | 17.01 | −16.98 | 0 |
| 1.23 | 1 | 0.125 | −112.69 | −67.311 | −89.99 | −89.985 | −89.985 | −89.985 | 22.70 | −22.67 | 0 |

As can be observed from Table 8 and 9, for the phase A-phase B arc fault at different fault positions, the impedance angle-based method with the predefined criteria $|\Delta\varnothing_A + \Delta\varnothing_B| \Rightarrow \Delta\varnothing_C$ && $(|\Delta P\varnothing_A| > \varnothing_{Set})$ && $(|\Delta\varnothing_B| > \varnothing_{Set})$ helps to accurately detect the fault even at lower fault positions in contrast to Table 2. For this example, the threshold value $\varnothing_{set}$ was set to 1 degree.

On comparing the results of Examples 1 and 2 for phase arcing fault at different fault positions with the results of protection schemes based on the magnitude of voltages and current as shown in Table 2, it can be observed that when a fault occurs at the lower units of the capacitor bank (m=0.875) it can initiate a cascading failure when using overcurrent or overvoltage. However, the present subject matter can avoid cascading failure using the active power-based method, the impedance angle-based method, or both for fault detection.

Thus, the methods and devices of the present subject matter detect phase arcing faults in a shunt capacitor bank within a short interval of time and can be reliably performed to avoid cascading failures of capacitor units and subsequent damages to the power system.

The invention claimed is:

1. A method for detecting a fault in a shunt capacitor bank connected in a power system, the method comprising:
   obtaining voltage measurements and current measurements at a terminal of the shunt capacitor bank;
   computing an electrical parameter based on the voltage and current measurements, wherein the electrical parameter is an impedance angle or an active power;
   calculating a difference between a first and a second value of the electrical parameter for a plurality of phases; and
   detecting the fault based on the difference, wherein detecting the fault comprises determining whether a predefined criterion is met, wherein the predefined criterion comprises:
      an absolute value of sum of the difference between the first and the second value of the electrical parameter of a first one of the phases and the difference between the first and the second value of the electrical parameter of a second one of the phases is greater than the difference between the first and the second value of the electrical parameter of a third one of the phases; and
      the absolute value of difference between the first and the second value of the electrical parameter of the first one of the phases and the absolute value of difference between the first and the second value of the of electrical parameter of the second one of the phases are each greater than a respective threshold value.

2. The method as claimed in claim 1, wherein: voltage measurements and current measurements are obtained in each phase at the terminal of the shunt capacitor bank.

3. The method as claimed in claim 1, wherein: the first and the second value of the electrical parameter are consecutive to each other.

4. The method as claimed in claim 1, wherein the fault is detected as a phase to phase fault between the first one of the phases and the second one of the phases.

5. The method as claimed in claim 1, wherein the respective threshold value of the electrical parameter is set based on accuracy of the measurement equipment.

6. The method as claimed in claim 1, wherein the shunt capacitor bank is connected to a three-phase transmission line in a double wye configuration.

7. The method as claimed in claim 1, wherein the fault is detected prior to cascading failure of the shunt capacitor bank.

8. A method for detecting a fault in a shunt capacitor bank connected in a power system, the method comprising:
   obtaining voltage measurements and current measurements at a terminal of the shunt capacitor bank;
   computing an electrical parameter based on the voltage and current measurements, wherein the electrical parameter is an impedance angle or an active power, wherein, to determine the electrical parameter, an arc resistance is computed based on Warrington formula;
   calculating a difference between a first and a second value of the electrical parameter; and
   detecting the fault based on the difference.

9. A device for detecting a fault in a shunt capacitor bank connected to a power system, the device comprising:
   a processor; and
   a fault detection module executable by the processor to:
      obtain voltage measurements and current measurements at a terminal of the shunt capacitor bank;
      compute an electrical parameter based on the voltage and current measurements, wherein the electrical parameter is an impedance angle or an active power;
      calculate a difference between a first and a second value of the electrical parameter for a plurality of phases; and detect the fault based on the difference, wherein the fault detection module is executable to detect the fault based on meeting of a predefined criterion, wherein the predefined criterion comprises:
  an absolute value of sum of the difference between the first and the second value of the electrical parameter of a first one of the phases and the difference between the first and the second value of the electrical parameter of a second one of the phases is greater than the difference between the first and the second value of the electrical parameter of a third one of the phases; and
  the absolute value of difference between the first and the second value of the electrical parameter of the first one of the phases and the absolute value of difference between the first and the second value of the electrical parameter of the second one of the phases are each greater than a respective threshold value.

10. The device as claimed in claim 9, wherein the fault is detected as a phase to phase fault between the first one of the phases and the second one of the phases.

11. The device as claimed in claim 9, wherein when the respective threshold value of the electrical parameter is set based on accuracy of the measurement equipment.

12. A device for detecting a fault in a shunt capacitor bank connected to a power system, the device comprising:
  a processor; and
  a fault detection module executable by the processor to:
    obtain voltage measurements and current measurements at a terminal of the shunt capacitor bank;
    compute an electrical parameter based on the voltage and current measurements, wherein the electrical parameter is an impedance angle or an active power, wherein, to determine the electrical parameter, the fault detection module is configured to compute an arc resistance based on Warrington formula;
    calculate a difference between a first and a second value of the electrical parameter; and
    detect the fault based on the difference.

13. The device as claimed in claim 12, wherein voltage measurements and current measurements are obtained in each phase at the terminal of the shunt capacitor bank.

14. The device as claimed in claim 12, wherein: the first and the second value of the electrical parameter are consecutive to each other.

15. The device as claimed in claim 12, wherein the shunt capacitor bank is connected to a three-phase transmission line in a double wye configuration.

16. The device as claimed in claim 12, wherein the fault detection module is configured to detect the fault prior to cascading failure of the shunt capacitor bank.

17. A non-transitory computer readable medium comprising instructions that, when executed by a processor, cause the processor to:
  obtain voltage measurements and current measurements at a terminal of a shunt capacitor bank;
  compute an electrical parameter based on the voltage and current measurements, wherein the electrical parameter comprises an impedance angle or an active power;
  calculate a difference between a first and a second value of the electrical parameter for a plurality of phases; and
  detect a fault based on the difference, wherein detecting the fault comprises determining whether a predefined criterion is met, wherein the predefined criterion comprises:
    an absolute value of sum of the difference between the first and the second value of the electrical parameter of a first one of the phases and the difference between the first and the second value of the electrical parameter of a second one of the phases is greater than the difference between the first and the second value of the electrical parameter of a third one of the phases; and
    the absolute value of difference between the first and the second value of the electrical parameter of the first one of the phases and the absolute value of difference between the first and the second value of the of electrical parameter of the second one of the phases are each greater than a respective threshold value.

18. The non-transitory computer readable medium as claimed in claim 17, wherein voltage measurements and current measurements are obtained in each phase at the terminal of the shunt capacitor bank.

* * * * *